United States Patent [19]

Ball

[11] 4,084,247

[45] Apr. 11, 1978

[54] FLUID LOADING ARM ALARM SYSTEM

[75] Inventor: Peter Ball, Sheffield, England

[73] Assignee: FMC Corporation, San Jose, Calif.

[21] Appl. No.: 735,730

[22] Filed: Oct. 26, 1976

[51] Int. Cl.[2] .......................... G01C 1/00; B65B 1/04; G01B 3/56

[52] U.S. Cl. .................................... 364/559; 141/387; 33/1 M

[58] Field of Search ........... 235/151.3, 151.32, 151.33, 235/151.34, 150.2; 33/1 M; 222/527, 537, 526; 141/279, 284, 387, 388

[56] References Cited

U.S. PATENT DOCUMENTS

| | | | |
|---|---|---|---|
| 3,434,497 | 3/1969 | Bily | 141/387 X |
| 3,455,333 | 7/1969 | Bily | 141/387 X |
| 3,505,514 | 4/1970 | Fathauer | 235/151.33 X |
| 3,586,841 | 6/1971 | Griffin | 235/151.33 |
| 3,618,064 | 11/1971 | Hamilton | 235/151.33 X |
| 3,638,211 | 1/1972 | Sanchez | 235/151.33 X |
| 3,819,922 | 6/1974 | Horn et al. | 235/151.33 X |
| 3,944,798 | 3/1976 | Eaton | 235/151.3 |
| 3,974,864 | 8/1976 | Fournier et al. | 141/387 X |
| 3,999,498 | 12/1976 | Flory | 141/387 X |
| 4,006,347 | 2/1977 | Hohmann | 235/150.2 |

*Primary Examiner*—Edward J. Wise
*Attorney, Agent, or Firm*—W. W. Ritt, Jr.

[57] ABSTRACT

A system for sensing the position in space of the outer end of an articulated fluid loading arm while it is connected to a marine tanker or other transport vessel, and sounding an alarm if the arm's operating envelope is exceeded. The sensing system includes means for determining various angles representative of the orientation of the booms or limbs of the arm, and means for deriving from these angles an indication of the spatial location of the arm's outer end.

9 Claims, 8 Drawing Figures

FIG_2
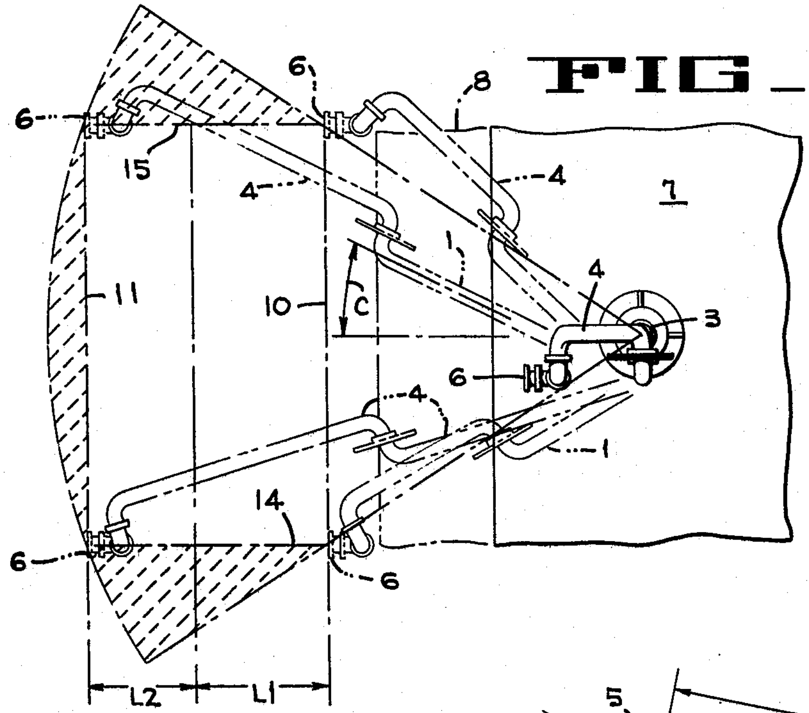
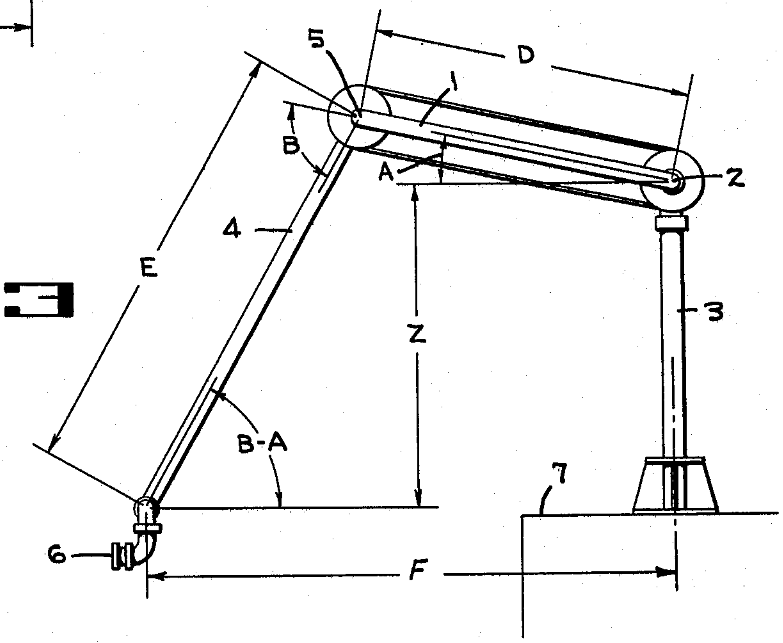
FIG_3
FIG_4
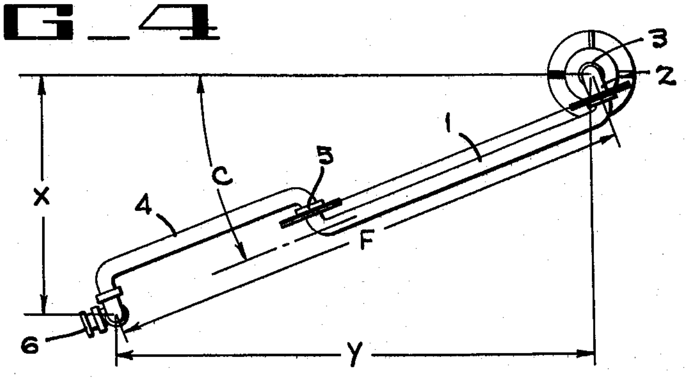

FLUID LOADING ARM ALARM SYSTEM

BACKGROUND OF THE INVENTION

This invention relates to articulated fluid transferring apparatus, and more particularly to marine loading arms and alarm systems for determining the spatial position of the outer end of such an arm with respect to the arm booms or limbs.

Fluid loading arms constructed of articulated pipe are extensively used in the petroleum industry for transferring oil or other fluids between a jetty, wharf, or other loading station and a marine tanker moored alongside. Such an arm generally comprises an inboard boom or limb supported on a vertical riser pipe by pipe swivel joints to facilitate pivotal movement about horizontal and vertical axes, and an outboard boom or limb connected by a pipe swivel joint to the inboard limb so as to be pivotal relative thereto about a horizonal axis. The outer end of the outboard limb is adapted to be connected to a pipe manifold on the tanker located within the reach of the arm, such as by a remotely-controllable coupler device.

When an installation of this type is being designed, minimum requirements are set for the reach of the arm. These requirements are expressed in terms of the maximum horizontal displacement of the tanker parallel to and away from the jetty relative to a datum position, the maximum displacement away from the jetty due to variations in the distance between the tanker manifold and the tanker rail, and the maximum vertical displacement due to variations in the water level and the height of the tanker manifold relative to the water level. These displacements define a three-dimensional space that is rectangular in section when viewed in plan or in elevation, either parallel to or perpendicular to the jetty, and this space is known as the arm's "operating envelope". The arm must be able to accommodate all of these displacements so that a safe and secure connection to the tanker's manifold can be established and maintained within the limits of this envelope.

Most articulated arms are counterbalanced so that when empty they are substantially self-supporting. However, the weight of the oil or other fluid in the arm during use is not counterbalanced, and thus must be supported in part by the tanker manifold to which the arm is connected. Clearly, the stress on the manifold increases with the extension of the arm. In addition, the manifold always faces towards the tanker rail, and the stress to which the manifold can be subjected in a direction perpendicular to the rail, and hence to the jetty, is greater than the stress to which it can be subjected parallel to the rail. The stress parallel to the rail increases with an increase in the slew angle, that is the angle between the vertical plane in which the arm resides and the vertical plane through the riser and normal to the edge of the jetty. Thus, to prevent the stresses on the manifold from exceeding safe limits, the extension of the arm and the slew angle must be limited.

To achieve this limitation, alarm systems have been provided for actuation in the event of the angle between the inboard and outboard limbs exceeding a predetermined limit, or in the event of the slew angle exceeding a predetermined limit. These independent limits result in operating characteristics which are not entirely satisfactory, for they in effect define a space within which the arm can operate that is bounded either by arcuate surfaces or by planes passing through the vertical pivot axis of the arm on the riser. Thus, if a specified rectangular operating envelope is to be accommodated, fairly extensive areas outside this envelope will also be within the operating range of the arm, and the stresses which occur when the end of the arm is in these outside areas can substantially exceed those occurring within the envelope.

SUMMARY OF THE INVENTION

The present invention comprises a system for sensing the position in space of the end of an articulated fluid loading arm, the arm comprising a plurality of pivotally connected booms or limbs one of which is pivotally mounted on a vertical riser or other fixed support. The system includes means for sensing a first angle representative of the orientation of one limb of the arm, means for sensing a second angle representative of the orientation of that limb or at least one other limb, and means for deriving from the sensed angles an indication of the position in space of the end of the arm.

The invention also provides an articulated arm for connecting a fixed fluid conduit to a movable manifold, the arm comprising a plurality of pivotally connected limbs one of which is pivotally mounted on a vertical riser or other fixed support and connected to the conduit, means for sensing a first angle representative of the orientation of one limb, means for sensing a second angle representative of the orientation of that limb or at least one other limb, and means for deriving from the sensed angles an indication of the position in space of the end of the arm.

The angle-sensing means functions to determine the orientation of the arm's inboard limb, that is the limb which is mounted on the riser, with respect to its movement about the vertical axis at the riser, and/or the inclination of this limb with respect to the horizontal. In addition, the angle-sensing means functions to sense the orientation of both inboard and outboard limbs relative to each other, and/or the inclination of the outboard limb with respect to the vertical.

Preferably the deriving means indicates whether or not the end of the arm is within a space envelope having predetermined limits, and this means is arranged to actuate an alarm in the event of the end of the arm moving outside these limits. The sensing means may be mechanical, but are preferably electrical such that electrical signals are produced representative of the orientations of the limbs. The sensing means may provide either analogue or digital outputs. By suitable modification and/or combination of the electrical signals, for example by amplification and summation, a composite signal can be produced which may be compared with a reference signal to determine whether or not the end of the arm is within the predetermined space envelope.

Accordingly, one object of the present invention is to provide an articulated fluid loading arm that obviates or mitigates the problems discussed above.

Another object of the present invention is to provide an improved system for sensing the spatial position of the outer end of an articulated fluid loading arm during use of the arm for transfer of fluid between a wharf or jetty and a marine tanker or other transport vessel.

Another object of the present invention is to provide an improved means for preventing extension of the outer end of a marine loading arm beyond the safe limits of its operating envelope.

Still another object of the present invention is to provide a new electrical sensing system that will trigger an alarm system when the outer end of an articulated loading arm exceeds its operating envelope.

The foregoing and other objects and advantages of the present invention will become apparent from the following description thereof, including the accompanying drawings.

BRIEF DESCRIPTION OF THE DRAWINGS

FIG. 2 is a schematic plan view of the arm and operating envelope of FIG. 1.

FIG. 3 is a schematic side elevation of the arm of FIGS. 1 and 2, illustrating the arm's geometry from which the location of the arm's outer end can be derived.

FIG. 4 is a schematic plan view of the arm of FIG. 3, illustrating the arm's geometry in a horizontal plane.

DESCRIPTION OF THE PREFERRED EMBODIMENT

Figure 1:
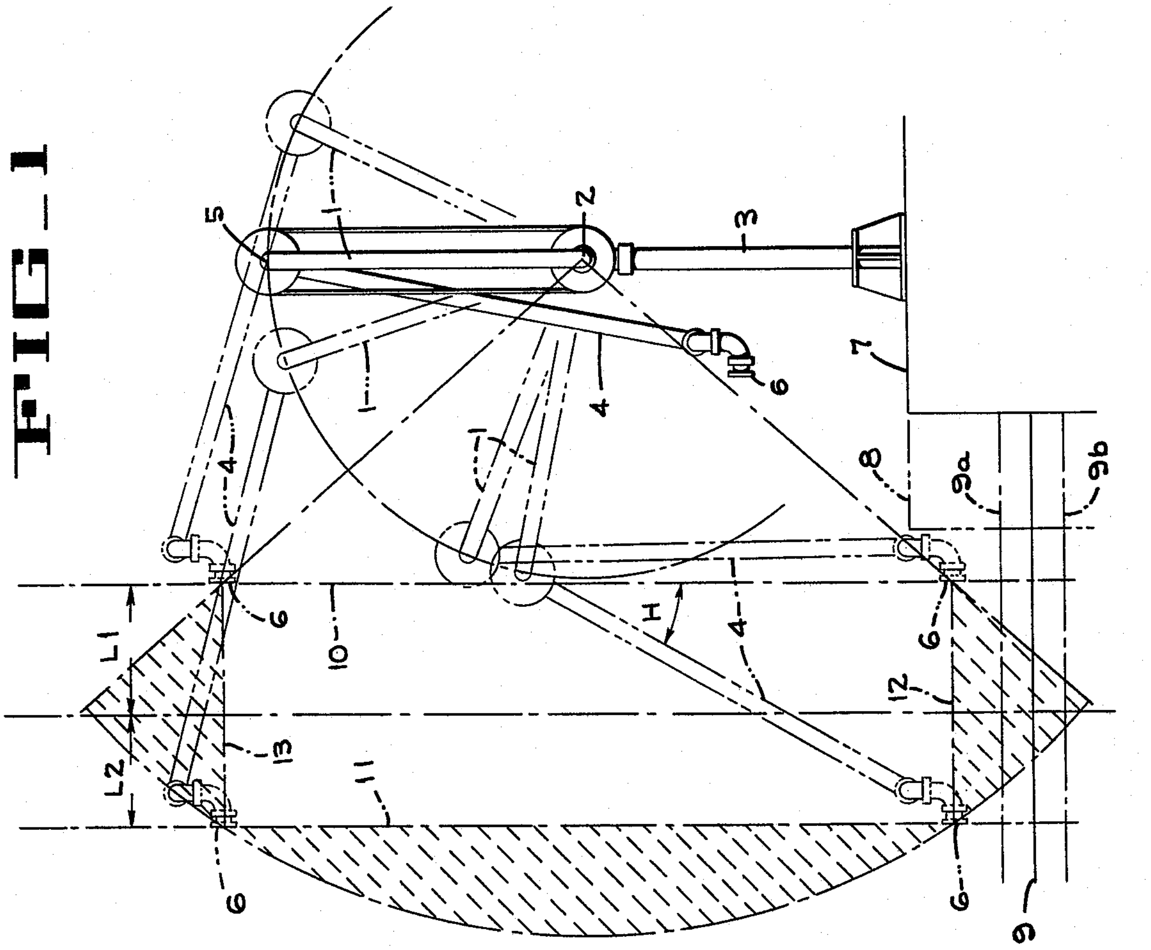
FIG. 1 is a schematic side elevation of an articulated fluid loading arm mounted on a jetty or wharf according to the present invention, illustrating in phantom the arm in several operating positions, and also showing the arm's operating envelope as viewed from the side.

Referring to FIGS. 1 and 2 of the drawings, an articulated arm according to the present invention is shown comprising an inboard limb 1 pivotally connected about a horizontal axis at 2 to a riser or other fixed conduit 3. The articulated arm also comprises an outboard limb 4 pivotally connected about another horizontal axis at 5 to the inboard limb, and a connecting device 6, such as a pipe flange or coupler, at the outer end of the limb 4 arranged for connecting the arm to a tanker manifold. The entire articulated arm assembly is mounted on a jetty 7 provided with a flexible fender 8.

The mean sea level is represented in FIG. 1 by the horizontal solid line 9, and the high and low water lines are represented by dash-dot lines *9a*, *9b* respectively, above and below the line 9. The installation is designed to accommodate a variety of tankers and tanker movements during a loading operation. The arm's operating envelope is defined as being limited by vertical planes 10, 11, 14, and 15, and horizontal planes 12 and 13, as illustrated in FIGS. 1 and 2.

The freedom of movement between the planes 10 and 11 in the horizontal direction away from the jetty 7 is accounted for by a portion L1 which represents the variations in the distance between the manifold and rail of various tankers, and a portion L2 which represents the allowable movement of the tanker towards or away from the jetty.

The freedom of movement between planes 12 and 13 in the vertical direction is accounted for by variations in sea level, variations in the height of tankers, and variations in the height of a tanker manifold above sea level as the tanker is filled. The freedom of movement between the planes 14 and 15 is accounted for by allowable movements of the tanker parallel to the jetty. To accommodate these movements it must be possible for the connecting device 6 to reach a manifold located anywhere within the three dimensional operating envelope defined by vertical planes 10, 11, 14 and 15 and horizontal planes 12 and 13.

The phantom representations of the arm in FIG. 1 show the orientations of the limbs 1 and 4 when the arm is located in a vertical plane through the riser 3 and perpendicular to the edge of the jetty, and when the connecting device 6 is in each one of the four corners of the rectangle defined by planes 10, 11, 12 and 13. It will be appreciated that if an indication is to be given when the connecting device 6 moves beyond the plane 11 for example, it is necessary to monitor both angles A and B (FIG. 3). If only one of these angles is monitored, it would not be possible to define the plane 11 so as to determine when the connecting device 6 moves beyond this plane. As should be readily apparent, when the arm is connected to a tanker manifold the stress on the manifold increases as the connecting device 6 moves away from the jetty 7.

FIG. 2 shows the horizontal orientations of the limbs 1 and 4 when the connecting device 6 is located at each one of the intersections between the planes 10, 11, 12 and 13. If for example, we consider the connecting device 6 when at the intersection of planes 11 and 15, any increase in skew angle C without a contraction of the arm would take the connecting device 6 beyond the plane 15. Although the vertical component of stress on the tanker manifold beyond the plane 15 would be no greater than if it were located at the intersection of planes 11 and 15, the lateral component of stress parallel to the vertical face of the jetty 7 would be increased, and therefore the total combination of stresses would be unacceptable. Since the tanker manifold faces towards the tanker rail, this lateral stress component constitutes a shearing force and bending moment which can damage the manifold.

The shaded portions in FIG. 1 represent the areas outside the operating envelope into which the connecting device 6 can move if angle A is varied while angle B (FIG. 3) is maintained at the fixed value shown. The shaded portions in FIG. 2 represent the areas outside the operating envelope into which the connecting device 6 can move if angle C (FIGS. 2 & 4) is varied while angles A and B remain unchanged.

In order to provide the desired indication when the connecting device 6 moves outside the three dimensional operating envelope defined by planes 10, 11, 12, 13, 14 and 15, sensors are arranged to monitor the angle A (FIG. 3) to provide an indication of the orientation of the limb 1 relative to the riser 3, the angle B to provide an indication of the orientation of the limb 4 relative to the limb 1, and the skew angle C (FIG. 2). The sensors may comprise a variety of transducers, for example potentiometers or other known devices to provide analog outputs, or a series of limit switches to provide digital outputs. For example, in the case of potentiometers, the track of the potentiometer can be connected to the limb 1, and the wiper of the potentiometer connected to the limb 4. The signals representative of the angles, A, B and C of rotation are suitably combined to provide a composite signal or signals representative of the position of the connecting device 6. Known electronic techniques for modifying the signals provided by the sensors may be used to obtain, for example, a voltage signal which indicates that the connecting device 6 is within the three dimensional operating envelope if the voltage signal is below a given threshold, and which indicates to the contrary if it is above the threshold. The voltage signal can be used to trigger an alarm device 50 (FIG. 5) as desired.

As shown in FIG. 3, the inboard limb 1 has a known length D, and the outboard limb 4 has a known length E. In FIG. 4, the variable distance between vertical lines drawn through the pivot point 2 and connecting device 6 is indicated as F. In FIGS. 3 and 4, X, Y and Z are coordinates with point 2 as their common origin.

The apparatus of the present invention operates by measuring the angles A, B, and C using standard Synchro resolvers that provide outputs proportional to the sine and cosine of the angle of arm rotation, so that direct measurements of cos A, sin A, cos (B-A), sin (B-A), cos C and sin C are available. Distance F is computed using the following relationship:

$$F = D \cos A + E \cos (B\text{-}A).$$

Distances X and Y are then computed from the following relationships:

$$X = F \sin C,$$

$$Y = F \cos C.$$

Distance Z is computed as follows:

$$Z = D \sin A - E \sin (B\text{-}A).$$

Each of the quantities *X, Y* and *Z* are computed and then compared with preset limits, and an alarm is sounded if any limit is exceeded. The circuits which perform these operations are described in detail below.

Figure 5:
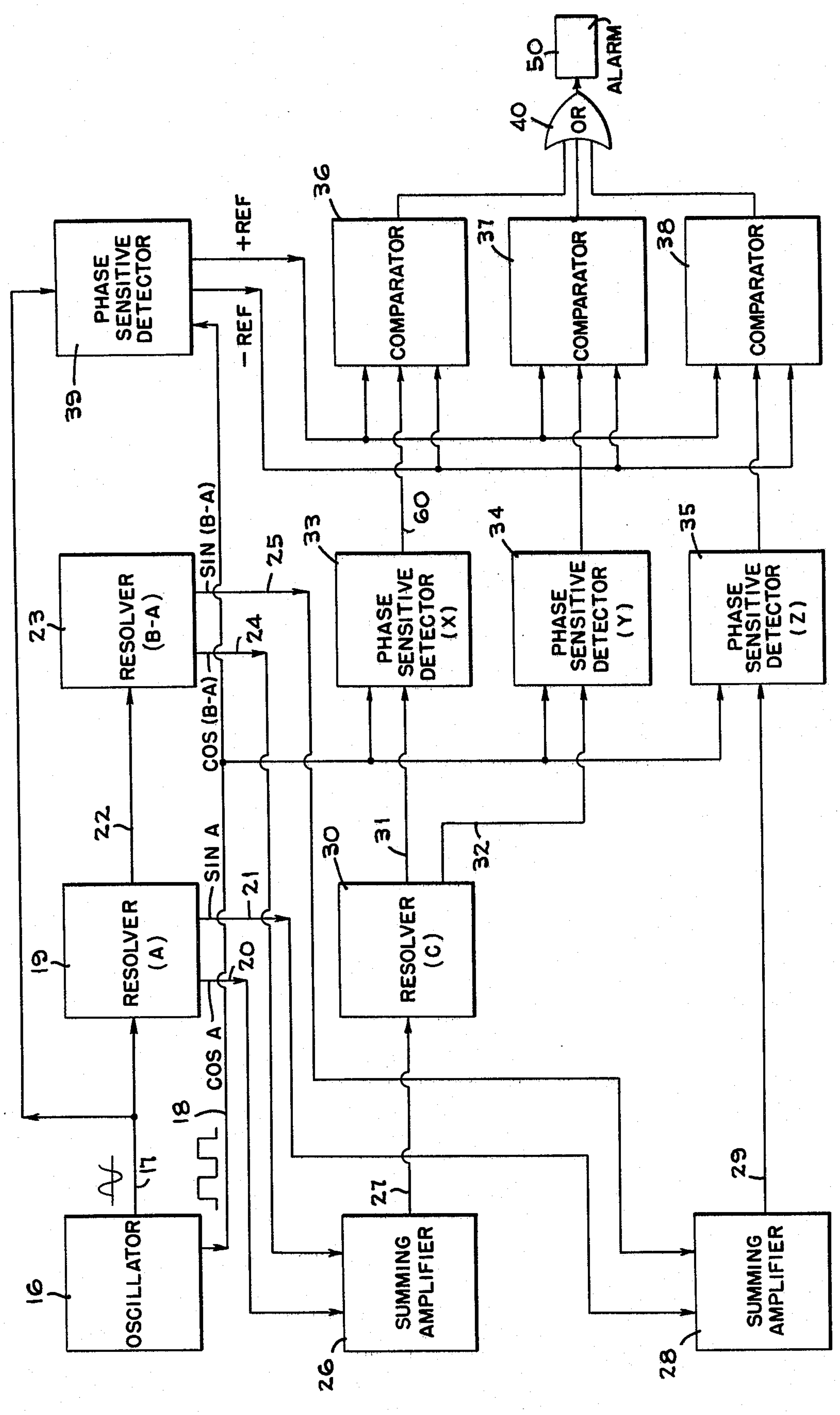
FIG. 5 is a block diagram of a position monitoring and alarm activating circuit according to the present invention.

The position monitoring and alarm activating circuit of FIG. 5 comprises an oscillator 16 providing a 400 Hz, 3 volt peak-to-peak sine wave output 17 and a 400 Hz, 0-to-12 volt square wave output 18. The output 17 is applied to a first resolver 19 which senses the angle A and provides 400 Hz outputs 20, 21 and 22, the amplitudes of which are modulated to represent cos A, sin A, and A, respectively. The output 22 of the first resolver 19 drives a second resolver 23 that senses the angle B and further modulates the output 22 to provide 400 HZ outputs 24 and 25 representing respectively, cos (B-A) and sin (B-A). Small phase shifts of the 400 Hz drive waveform which occur in the resolvers are corrected by capacitive networks.

A first feedback summing amplifier 26 sums the cosine signals 20 and 24 with gains respectively proportional to D/(D+E) and E/(D+E) to provide an output 27 representative of F/(D+E). The distances D, E and F are scaled with respect to the maximum distance possible in the system, that is D+E, to ensure maximum accuracy. A second feedback summing amplifier 28 sums the sine signals 21 and 25 with gains respectively proportional to D/(D+E) and E/(D+E) to provide an output 29 representative of Z/(D+E). A third resolver 30 senses angle C (FIG. 4) and provides outputs 31 and 32 representative respectively of (F sin C)/(D+E), i.e. X/(D+E), and (F cos C)/(D+E), i.e. Y/(D+E), to first and second phase sensitive detectors 33 and 34. The signal 29, i.e. Z/(D+E) is applied to a third phase sensitive detector 35.

Each phase sensitive detector 33, 34, 35 is driven by the square wave output 18 of the oscillator 16 to convert its input to a D.C. signal, which D.C. signal is applied to a respective comparator 36, 37 or 38. These comparators each receive negative and positive reference signals from a fourth phase sensitive detector 39 also driven by the square wave output 18 of the oscillator 16. These reference signals are adjusted within the comparators to define maximum and minimum values for the signals passed to the comparators by the detectors 33, 34 and 35, and the comparators provide outputs to an OR gate 40 whenever the input signals thereto are outside the maximum and minimum values. The OR gate then passes any comparator output to an alarm 50 as indicated in FIG. 5.

Figure 6:
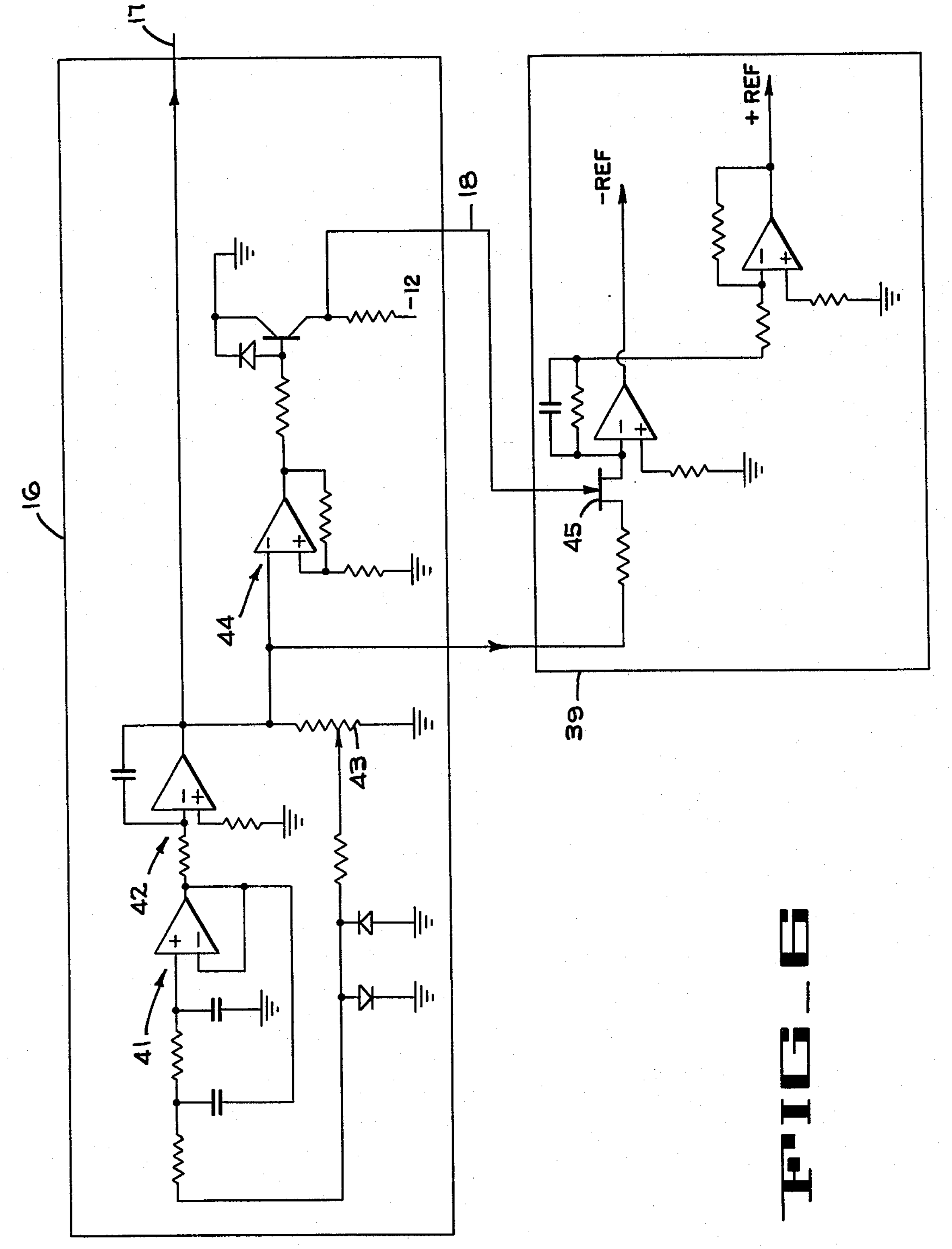
FIG. 6 is a schematic of the oscillator 16 and the phase sensitive detector 39 of FIG. 5.

As shown in FIG. 6, the oscillator 16 consists of a second order active filter 41 cascaded with an integrator 42. A feedback path controlled by a potentiometer 43 ensures automatic start-up, and a symmetrical output. A Schmidt trigger 44 driven directly by the oscillator sine wave output 17 provides a square-wave reference signal 18 (0 – 12v) for the phase-sensitive detector 39. Positive and negative D.C. reference voltages are derived from the phase sensitive detector 39 operating on the sine wave reference signal 17, thus ensuring that any changes in the reference drive to the resolvers 19, 23 are tracked by the X, Y and Z reference limits. The operation of the phase sensitive detector 39 is controlled by a transistor 45 to which the signal 18 is applied.

Figure 7:
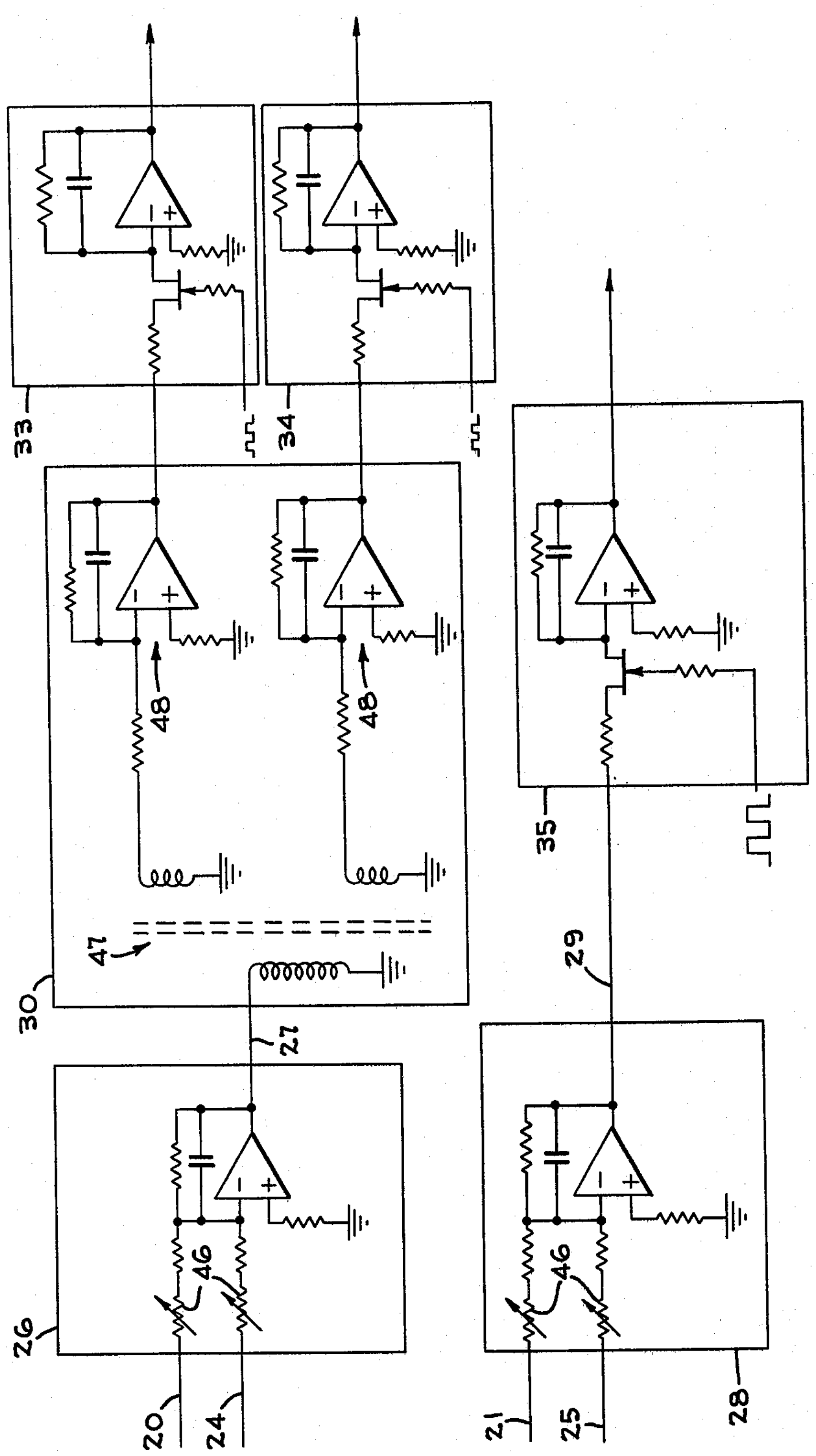
FIG. 7 is a schematic of the summing amplifiers 26 and 28, the resolver 30, and the phase sensitive detectors 33, 34, 35 of FIG. 5.

Referring now to FIG. 7, the summing amplifiers 26 and 28, the resolver 30, and the phase sensitive detectors 33, 34 and 35 are shown in detail. The amplifiers 26 and 28 are of standard form and are provided with scaling potentiometers 46 at each of their inputs. Their outputs are in the form of amplitude modulated 400 Hz sine waves. The output 27 of summing amplifier 26 is resolved into its X and Y components by a transformer arrangement 47, amplified by feedback amplifiers 48, and applied to the phase sensitive detectors 33 and 34. The output 29 of summing amplifier 28 is applied directly to detector 35. The detectors 33, 34 and 35 operate in the same manner as detector 39 (FIG. 5).

Figure 8:
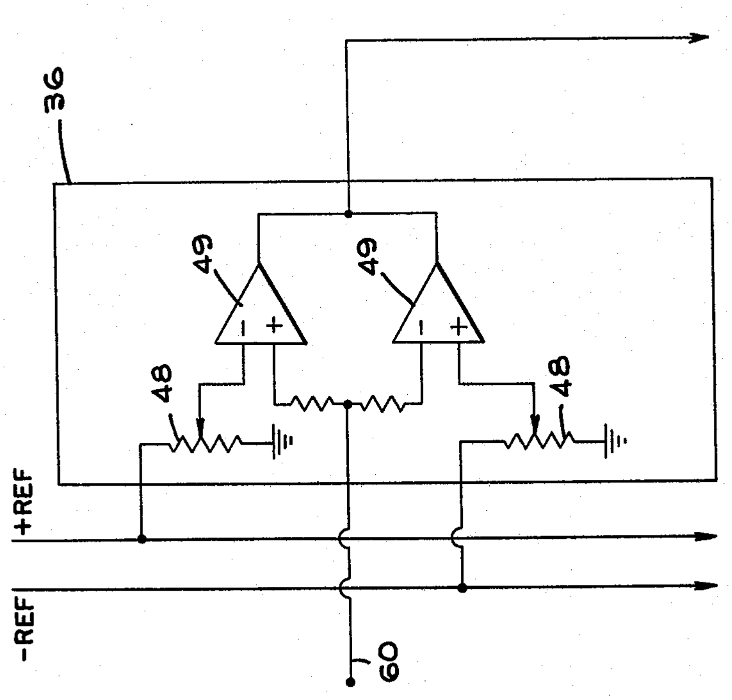
FIG. 8 is a schematic of one of the comparators 36, 37, and 38 of FIG. 5.

The comparators 36, 37 and 38 (FIG. 5) are identical, and thus the FIG. 8 schematic for 36 is illustrative for 37 and 38 as well. Using comparator 36 as an example, the reference limits are derived from the positive and negative D.C. references by potentiometers 48. The computed signal for X, namely the output 60 of phase sensitive detector 33, is compared with these references using open-loop, high gain operational amplifiers 49. If any limit is exceeded, the appropriate amplifier output becomes greater than + 3v. This is used to turn on an alarm transistor through a diode OR gate 40 (FIG. 5). Positive action is ensured by the use of an R-C network with short rise-time and long fall time in this OR gate. The alarm transistor can operate, for example, a pair of hermetically sealed, reed-relay contacts in order to operate further alarm systems.

The equipment described may be used for various sizes of loading arm. Selected signals can be made available at an external socket to allow the constants appropriate to each arm to be set up. This setting-up will normally take place with the arm positioned in a given mechanical configuration.

Multiple working of a plurality of loading arms may be achieved either by designating one arm as a 'master' unit, or providing alarms which may be activated when any arm in operation exceeds its preset limits.

In the described arrangement, the distances D, E, and F are scaled with respect to the maximum arm length (D+E). If mechanical stops prevent the arm exceeding a length which is less than (D+E), this lesser length may be used for scaling purposes to obtain greater accuracy.

The above description refers to a system in which three angles A, B, and C are monitored. In some circumstances it may be that only the angles A and B need be monitored if variations in the angle A are found to have a negligible effect upon the stress. This would depend upon the geometry and requirements of particular installations. Furthermore, an angle H (FIG. 1) may be sensed to provide an indication of the orientation of the limb 4 relative to the vertical. This angle may be sensed in addition to the three angles A, B, and C, or as an alternative to one of these angles, or in combination with one of these angles. For example, knowledge of the angles B and H provide considerable information regarding the position of the coupler 16. It also should be understood that angles other than those mentioned above can be sensed if desired.

Although the best mode contemplated for carrying out the present invention has been herein shown and described, it will be apparent that modification and variation may be made without departing from what is regarded to be the subject matter of the invention.

I claim:

1. An articulated fluid loading arm for interconnecting a fixed conduit and a manifold, said arm comprising 1. a plurality of pivotally connected limbs one of which is pivotally mounted on a fixed support and connected to the conduit, and another of which has an end that functions as the outer end of the loading arm, and
2. an apparatus for sensing the position in space of said loading arm outer end, said apparatus comprising means for sensing a first angle representative of the orientation of one limb with respect to a first axis, means for sensing a second angle representative of the orientation of at least one other limb with respect to a second axis, and means for determining whether said sensed angles exceed preestablished upper and lower limits with respect to said first and second axes, whereby an indication of the position in space of the end of the arm can be ascertained.

2. An apparatus according to claim 1, comprising resolvers for generating electrical signals representative of the sensed angles, circuitry for computing from said electrical signals further signals representative of the positions in space of the end of the arm relative to the pivotal mounting of said one limb, means for providing reference signals representative of limits beyond which the end of the arm should not move, and means for comparing said further signals with the reference signals and actuating an alarm in the event of said limits being exceeded.

3. An apparatus according to claim 2 for sensing the position in space of the end of an articulated arm having an inboard limb and an outboard limb, said apparatus comprising a first resolver for sensing the angle A between the inboard limb and the horizontal, a second resolver for sensing the angle B representing the orientation of the inboard limb with respect to the outboard limb, and a third resolver for sensing the angle C representing the orientation of the inboard limb relative to a vertical plane.

4. An apparatus according to claim 3 wherein the first resolver provides an output representative of A to the second resolver and outputs representative of cos A and sin A to first and second summing amplifiers respectively, and wherein the second resolver provides outputs representative of cos (B-A) and sin (B-A) to said first and second summing amplifiers respectively.

5. An apparatus according to claim 4, wherein the first summing amplifier amplifies the cos A and cos (B-A) inputs thereto with gains proportional to the length D of the inboard limb and the length E of the outboard limb respectively, sums the amplified inputs to form a signal representative of the horizontal distance F between the ends of the arm, and applies the summed signal to the third resolver.

6. An apparatus according to claim 5, wherein the third resolver provides outputs representative of F sin C and F cos C to first and second phase sensitive detectors, and the second summing amplifies the sin A and sin (B-A) inputs thereto with gains proportional to D and E respectively, sums the amplified inputs to form a signal representative of the vertical distance between the ends of the arm, and applies the summed signal to a third phase sensitive detector, the outputs of the first, second and third phase sensitive detectors being representative of the X, Y and Z co-ordinates respectively of the end of the arm.

7. An apparatus according to claim 6, wherein the outputs of the phase sensitive detectors are applied to respective comparators each of which receives positive and negative reference signals from a fourth phase sensitive detector, each comparator being provided with means for setting time limit signals from the reference signals and for providing an output in the event of the input thereto being outside the range defined by the time set limit signals.

8. An apparatus according to claim 7, comprising an OR gate connected to the outputs of the three comparators and arranged to energize an alarm in the event of any comparator providing an output thereto.

9. An apparatus according to claim 3, wherein the first resolver and the fourth phase sensitive detector receive a first sine wave output of an oscillator, and each of the four phase sensitive detectors is driven by a square wave output of the oscillator.

* * * * *

UNITED STATES PATENT OFFICE
CERTIFICATE OF CORRECTION

Patent No. 4,084,247 Dated April 11, 1978

Inventor(s) PETER BALL

It is certified that error appears in the above-identified patent and that said Letters Patent are hereby corrected as shown below:

Column 7 - line 5, change "A and B" to --B and C--.

Signed and Sealed this

*Twenty-ninth* Day of *January 1980*

[SEAL]

*Attest:*

SIDNEY A. DIAMOND

*Attesting Officer* *Commissioner of Patents and Trademarks*